UNITED STATES PATENT OFFICE.

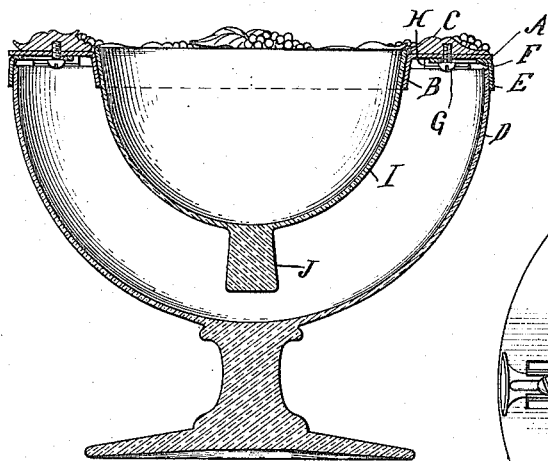
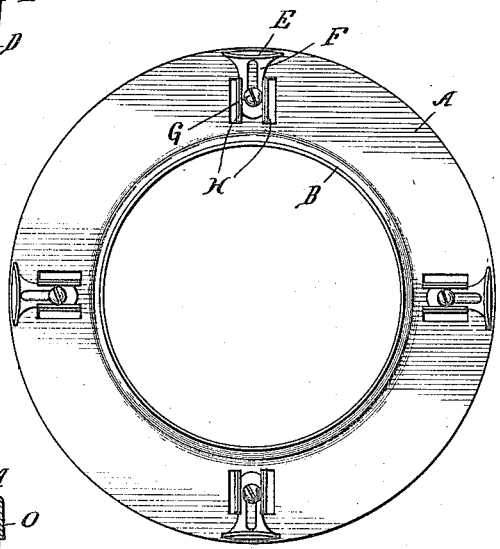
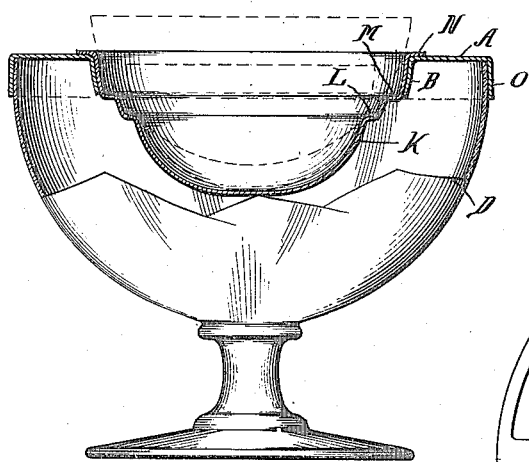
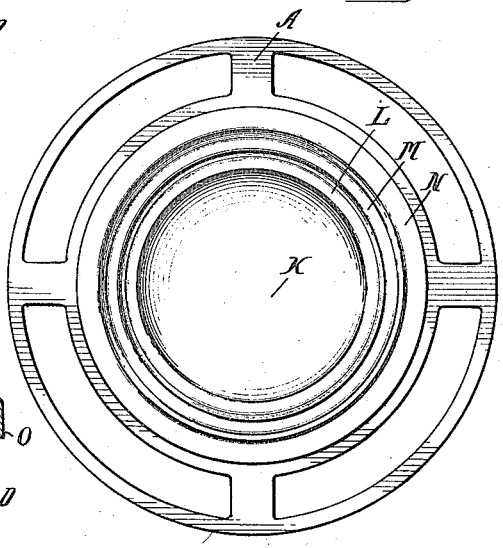
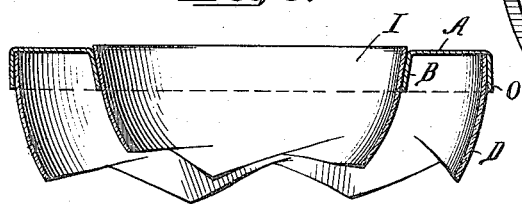

THOMAS P. PICK, OF CHICAGO, ILLINOIS.

FRUIT, SALAD, AND DESSERT DISH.

1,123,793.  Specification of Letters Patent.  Patented Jan. 5, 1915.

Application filed October 12, 1912. Serial No. 725,408.

*To all whom it may concern:*

Be it known that I, THOMAS P. PICK, citizen of the United States, residing at Chicago, in the county of Cook and State of Illinois, have invented certain new and useful Improvements in Fruit, Salad, and Dessert Dishes; and I do hereby declare the following to be a full, clear, and exact description of the invention, such as will enable others skilled in the art to which it appertains to make and use the same.

This invention has for its object to provide a novel fruit, salad and dessert dish, and consists in the features of construction and combinations of parts hereinafter fully described and particularly claimed.

In the accompanying drawings illustrating the invention; Figure —1— is a central vertical sectional view of a salad, fruit or dessert dish embodying my invention. Fig. —2— is a detail bottom plan view of the member for maintaining the inner and outer receptacles of the dish concentric with each other. Fig. —3— is a view partly in section and partly in elevation of a salad, fruit and dessert dish embodying my invention and showing an inner receptacle or dish for receiving citrous fruit. Fig. —4— is a fragmentary detail top plan view of a dish-centering member and the inner receptacle or dish shown in Fig. —3—. Fig. —5— is a fragmentary sectional view similar to Fig. —1— showing a modified form of construction.

At the present time goblets or stemmed glasses having substantially semi-spherical bowls are extensively used for serving fruits, salads and desserts, which latter are generally contained in smaller bowls adapted to be disposed within the larger and to rest upon and within cracked ice with which the larger receptacle is partially filled. The smaller receptacle when so disposed within the larger and supported upon the cracked ice is very easily tipped in the event of the contents offering resistance to removal by the spoon or fork. Furthermore, it has been found to be relatively difficult to properly position the same within the larger bowl.

To overcome the foregoing difficulties and, further, to provide a highly ornamental and convenient cover for the annular space between the larger and smaller receptacles is the primary object of this invention. As shown in Fig. —1— this device or cover comprises the ring member A consisting of a flat plate having a large central opening bordered by the annular tapered flange B. Mounted on the said plate A in any suitable manner are ornaments C which may be cast integral therewith, sweated thereon, or attached in any other suitable manner, or the plate itself may be ornamented in any well-known manner. In order that the said plate A may fit receptacles D of varying diameters the same is provided on its lower face with a plurality of radially adjustable lugs E which are adapted to engage the outer face of the bowl D. Each of said lugs E is provided with a longitudinally slotted shank F through the slot in which a set screw G passes into a threaded opening in the plate A and in the ornament C mounted thereon, where the latter is employed, and by means of which the said shank of the lug E may be secured in different positions. In order to prevent said lug E from becoming laterally displaced or rotating on the screw G as an axis, I prefer to provide guides for the said shank F consisting preferably of small substantially radially disposed parallel flanges H cut from the body of the plate A and bent down and over so that the free edges thereof oppose each other and overhang said shank F, this being accomplished in a well-known manner. The said lugs E may be adjusted to center the said plate A relatively to the bowl D in an obvious manner.

The smaller bowl I which is adapted to be maintained concentric, or substantially concentric, with the bowl D is supported contiguous to its rim by the flange B. Thus an annular space is provided between said bowls D and I which is adapted to contain cracked ice and the like, by means of which the temperature of the contents of the bowl I may be maintained as desired. A stem J depending from the bottom of the bowl I is adapted to be embedded in ice and be thereby held to prevent rocking of the bowl within the supporting ring or flange B.

My said invention also comprehends means for supporting citrous fruits, such as grape fruit and oranges within the bowl D concentric therewith in substantially the same manner as the bowl I is supported therein so that between the outer surface of the fruit and the inner surface of the bowl D an annular space will be provided for the reception of cracked ice and the like. In order to render easy the removal of the pulp and juice from the citrous fruit thus supported it is desirable that the same fit snugly within its receptacle so as to prevent free movement thereof relatively to the plate A. This is preferably accomplished by means of a bowl K of metal or other suitable material which is provided at different elevations with annular shoulders L and M whereby the diameter of the same is increased suddenly at a plurality of points between the bottom and rim thereof, the latter being provided with an annular flange N which rests upon the plate A. Thus the lower portion of the bowl K is adapted to receive small orange halves, while larger orange or grape fruit halves are adapted to rest upon the shoulders L and M or upon the rim of the bowl K.

Where the bowls D of the outer receptacle are of standard size, the adjustable lugs E are not required to be used and in place thereof the plate A may, as shown in Figs. —3— and —5—, be provided on its outer edge with an annular flange O within which the rim of the bowl D is adapted to be received.

I claim as my invention:

1. The combination with two bowls of different diameter, of means for maintaining the same concentric with each other comprising a plate having a central opening in which the smaller bowl is adapted to be received and its rim portion engaged, said plate adapted to rest upon the rim of the larger bowl, and separated depending devices carried by said plate and radially adjustable thereon for engaging a circumferential wall of said rim of said larger bowl for preventing relative lateral movement of the latter and said plate.

2. In a device of the character described, a supporting plate having an open interior bordered by a depending flange and a depending part at its outer edge, said depending part being adjustable toward and from said flange, substantially as and for the purpose described.

3. A fruit dish of the character described comprising an outer bowl having a continuous smooth bottom, an approximately semispherical inner bowl of substantially smaller size within the outer bowl, and means separate from both of said bowls engaging the upper edges of the bowls for supporting the one within the other to leave an ice space between the two bowls entirely around and under the inner bowl, and a stem on the inner bowl projecting into said ice space and terminating above the inner surface of the outer bowl to engage the ice so that said ice will prevent rocking of the curved inner bowl in said supporting means, substantially as described.

4. In a fruit dish of the character described, an outer bowl, a separate inner bowl, and means separate from both of said bowls for supporting the inner bowl within the outer bowl comprising a plate having a downwardly turned flange adapted to engage the outer face of the inner bowl, and means bridging the space between the two bowls and having a depending portion adapted to engage the outer face of the outer bowl, substantially as described.

5. In a fruit dish of the character described, an outer bowl, a separate semispherical inner bowl, and means separate from both of said bowls for supporting the inner bowl within the outer bowl comprising a plate having an inturned flange contracting at its lower end to conform to the tapering of the inner bowl and adapted to engage the outer face of the said bowl, and means bridging the space between the two bowls and having a depending portion adapted to engage the outer face of the outer bowl.

6. In a device of the character described, an outer bowl, an inner bowl, and means for supporting the inner bowl within the outer bowl comprising a plate having an open interior for the reception of the inner bowl, separate devices spaced substantial distances apart at the outer portion of the plate for engaging the outer bowl, and means for adjusting said devices radially of the bowls toward and from the open interior of the inner bowl.

In testimony whereof I have signed my name in presence of two subscribing witnesses.

THOMAS P. PICK.

Witnesses:
M. M. BOYLE,
R. W. LOTZ.